United States Patent

[11] 3,597,745

[72] Inventors Allan E. Lahrson Oakland; Timothy L. Lenox, San Leandro; Robert J. Vannucci, Concord; Richard C. Zuchowski, San Francisco; Frank E. Hublou, Richmond all of, Calif.

[21] Appl. No. 851,371

[22] Filed Aug. 19, 1969

[45] Patented Aug. 3, 1971

[73] Assignee Kaiser Aluminum & Chemical Corporation

[54] METHOD FOR ARRANGEMENT AND INDEXING OF DIGITAL DATA IN STORAGE

4 Claims, 7 Drawing Figs.

[52] U.S. Cl. .......... 340/172.5

[51] Int. Cl. .......... G06f 9/20

[50] Field of Search .......... 340/172.5; 235/157

[56] References Cited

UNITED STATES PATENTS

| | | | |
|---|---|---|---|
| 3,366,928 | 1/1968 | Rice et al. | 340/172.5 |
| 3,412,382 | 11/1968 | Couleur et al. | 340/172.5 |

*Primary Examiner*—Raulfe B. Zache

*Assistant Examiner*—Sydney Chirlin

*Attorney*—Beveridge and De Grandi

ABSTRACT: A method of arranging digital data so that it may be most efficiently located and read out. Two levels of indices are used to locate each data record, a ten word or eighty character block of data. A single high level index tag refers to one of a plurality of secondary level index tags which, in turn, refer to the data record. The block containing the high level index tag also contains various file information.

INVENTORS
TIMOTHY L. LENOX
ROBERT J. VANNUCCI
RICHARD C. ZUCHOWSKI
FRANK E. HUBLOU
ALLAN E. LAHRSON

BY Beveridge & De Grandi
ATTORNEYS

INVENTORS
TIMOTHY L. LENOX
ROBERT J. VANNUCCI
RICHARD C. ZUCHOWSKI
FRANK E. HUBLOU
ALLAN E. LAHRSON

BY Beveridge & De Grandi

ATTORNEYS

METHOD FOR ARRANGEMENT AND INDEXING OF DIGITAL DATA IN STORAGE

This invention relates to a method of arranging data and more particularly to a method of arranging and storing digital data so that it may be most efficiently located and read out.

This specification discloses and claims subject matter relating to the subject matter of a case entitled Remote Input Management System, Ser. No. 851,242, filed Aug. 19, 1969, and assigned to the same assignee as herein. For use of the method of this invention in a data processing system, reference is made to the disclosure of that application. At various locations throughout this specification, reference is made to Remote Input Management System or its acronym, RIMS. The method of this invention may be practiced with virtually any data processing system and not just RIMS. The nomenclature, therefore, is intended to be descriptive and should not be interpreted to mean that this invention has application only within the Remote Input Management System, disclosed and claimed in the application cited above.

In data processing systems, there is constantly a need for storing large amounts of data. All large computers have core storage units which, in many cases, will hold thousands of words of data. Core capacity, however, is generally occupied by the programs controlling the computer and only that amount of data which is immediately necessary to the execution of the program or programs. Also, storage in core would be far too expensive for the large amounts of bulk data necessary to many applications as, for example, payroll programs.

As a result, bulk data is stored in storage devices peripheral to the main computer. Devices such as magnetic tapes, drums or disks may be used. Data is left in the peripheral device until it is needed by a program. At that time, small amounts are brought into core from the peripheral unit.

When a point is reached in a program where a portion of the bulk data is needed, the execution of the program must usually stop until the data is located in peripheral storage and brought into core. As may be readily appreciated, valuable computer time may be lost while the peripherally stored data is being located and copied.

Generally, data is associated in bulk storage with identifying numbers called sequence numbers. Data, with the accompanying sequence numbers, is usually sequentially recorded on such devices as disks. Location of a particular unit of data quite often involves sequentially reading into core units of data, comparing the data or the associated sequence numbers with the information desired and routing the units back if they do not match. Thereafter, the process may be repeated throughout the data file. If the desired data happens to be at the end of a multithousand word file, considerable time may be lost while the entire data file is being read unit-by-unit.

There is a need, therefore, for methods whereby a single unit of data may be quickly located in a stored data file in a minimum of time and with a minimum number of reads and comparisons. This invention fulfills this need. By arranging units of data in such a fashion that they are located by two levels of indexes, a data unit may be located and readout of storage in three reads rather than the many hundreds or thousands which may be necessary with other methods of arranging stored data.

Accordingly, it is an object of this invention to arrange stored data in such a fashion that it may be quickly and efficiently located and readout of storage.

It is another object of this invention to arrange stored data in such a fashion that it may be located and readout of bulk storage in a minimum of time.

It is a further object of this invention to provide plural levels of indices to locate units of stored bulk data.

It is a still further object of this invention to provide various information concerning the stored data in the indices.

These and other objects of this invention will become readily apparent from reference to the following specification and the drawings, wherein.

A RIMS indexed file is a series of 676 six blocks of recorded data, each block consisting of storage locations for 150 words. The first block of each RIMS file is a Level 2 index block, containing tags, each of which lead to single ones of 75 Level 1 index blocks located throughout the file. Each Level 1 index block is followed by eight data blocks containing 150 words or 15 data records each. A data record is 10 words—80 characters—in length and is the smallest unit of information retrievable by this invention.

Figure 1:
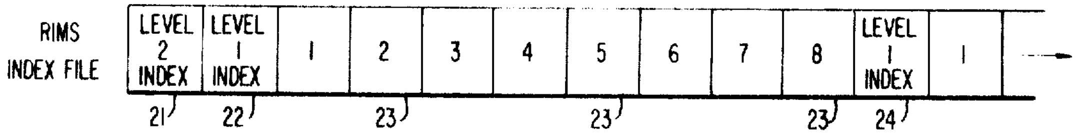
FIG. 1 is a diagram of the format of a file arranged and indexed according to this invention.

Referring to FIG. 1, an initial portion of a RIMS indexed file is shown. The file is composed of a total of 676 blocks of locations for recorded data, each block 150 words in length. Each rectangle in FIG. 1 represents a block length of 150 words.

Initial block 21 of the RIMS file shown in FIG. 1 is a Level 2 index block, the highest level index of the RIMS file. It is followed by Level 1 index block 22. A Level 1 index block occurs every ninth block, following the first block 22, throughout the RIMS file. Each Level 1 index block is followed by eight data blocks 23. Following the last data block of the first group (numbered 8 in FIG. 1), is second Level 1 index block 24. This sequence repeats itself throughout the RIMS file for a total of 75 five Level 1 index blocks followed by a total of 600 data blocks in groups of eight.

Figure 2:
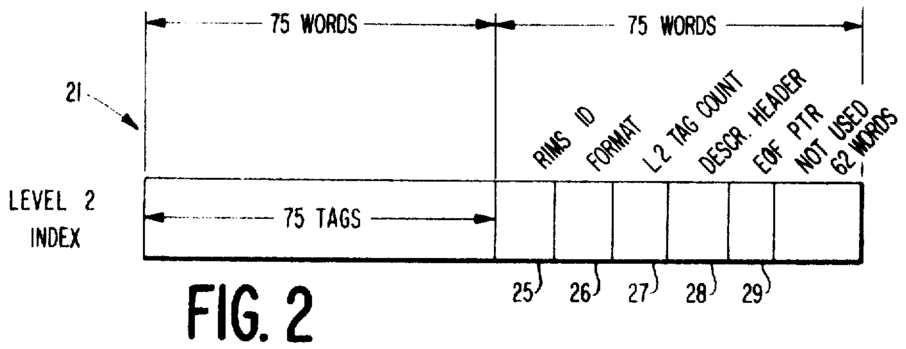
FIG. 2 is a diagram of a Level 2 index block.

Level 2 index block 21 of FIG. 1 is shown in detail in FIG. 2. As with all blocks, the block shown in FIG. 2 is a total of 150 words in length. The first 75 words of the block contain 75 tags, each tag one word or 48 bits in length. There is one tag in the Level 2 index block corresponding to each of the 75 Level 1 index blocks located throughout the file. The format of each tag will be explained in connection with the discussion of FIG. 3.

Following the 75 tags in FIG. 2 is a one word unit 25 labeled RIMS ID. Word 25 identifies the following file as a RIMS file. It is placed after the Level 2 tags rather than at the first word position so that it does not have to be loaded into core when the Level 2 tags are copied from disk.

Word 26 of FIG. 2 contains bits which indicate whether the data in the RIMS file is in FORTRAN, ALGOL, COBOL, DATA, GP-300 or BASIC format. The only difference in formats is the position of the sequence number relating to each block of data relative to the data itself. For example, in one format, the sequence number may occupy the first portion of the 80 characters whereas in another, its position may be the last portion of the 80 characters.

Word 27 is labeled L 2 TAG COUNT in FIG. 2. It contains a count of the Level 2 tags and, therefore, the number of Level 1 index blocks.

Following the L 2 TAG COUNT word is a nine word Descriptive Header portion 28. The Descriptive Header contains a narrative description of what is in the following file. It does not contain the file name, located instead in the disk directory. The purpose of the file Descriptive Header is to inform a user as to exactly what the file contains. For example, if a RIMS file is given a nondescriptive name, such as A/B, the user may have to check the Descriptive Header to recall what the file contains.

Word 29 in FIG. 2 is labeled EOF PTR. It is a word which points to the end of the RIMS file (End Of File). It is used to indicate the next location for data to be entered. The pointer is updated by the Data module.

Figure 3:
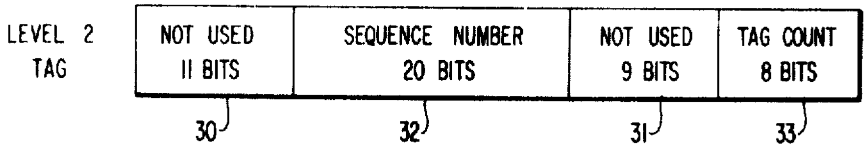
FIG. 3 is a diagram of a Level 2 index tag.

FIG. 3 shows the details of a single Level 2 index tag of which there are up to 75. First and third portions 30, 31, consisting of 11 and nine bit positions respectively, are not used. The number of empty bit positions in the Level 2 index tag is fixed but the location of the empty positions is arbitrary.

Second portion 32 of the Level 2 tag contains a sequence number. The number is the highest sequence number found in the Level 1 index block referred to by the tag. The sequence number portion is 20 bits in length. Therefore, it could represent a maximum sequence number of over one million; the maximum sequence number which may be utilized in RIMS, however is 999,999.

Following empty portion 31 in the Level 2 tag is an eight bit portion 33 which contains the count of the number of tags found in the Level 1 index block referred to by the Level 2 tag. Normally, the count is 120 although, as explained below, the tag count in a Level 1 index block may reach 150.

Figure 4:
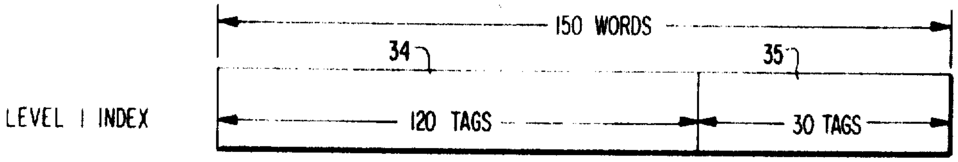
FIG. 4 is a diagram of a Level 1 index block.

FIG. 4 illustrates a Level 1 index block. As explained above, there are up to 75 such blocks in a single RIMS file. The block, 150 words in length, is divided into two portions 34, 35.

Portion 34, 120 words in length, contains up to 120 tags, each referring to one of the up to 120 data records following the Level 1 index block. Portion 35, initially empty, is 30 words in length and contains sufficient space for 30 tags to be inserted. Portion 35 is used for insertion of additional tags after portion 34 is full. Therefore, a single Level 1 index block may contain up to 150 tags.

Figure 5:
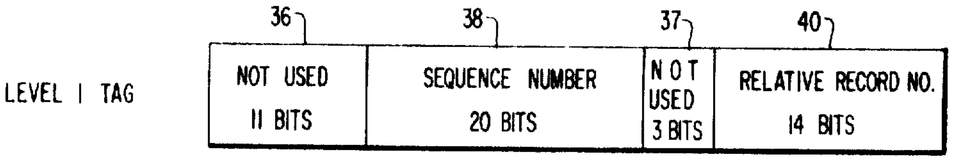
FIG. 5 is a diagram of a Level 1 index tag.

Each Level 1 index tag has the format shown in FIG. 5. As in the Level 2 tag format, initial 11 bit portion 36 and three bit portion 37 is empty and never used. As in the Level 2 index tag format, the total number of empty bit positions, 14, is fixed, but their location within the tag is arbitrary. The location, of course, does not change from index block to index block.

Second portion 38 of the Level 1 tag contains a sequence number in 20 bit positions. This sequence number is a number associated with a single data record of 10 words located somewhere within the eight data blocks following the Level 1 index block. Last portion 40 of the Level 1 tag contains a Relative Record Number in 14 bit positions. This is the sequential number location of the 10 word data record having the sequence number found in portion 38. The Relative Record Number begins counting the initial 10 word group in the first file block. Therefore, since the RIMS file is 101,400 words long, with a total of 10,140 10-word segments, the highest Relative Record Number of the 75th Level 1 index is 10,139.

Figure 6:
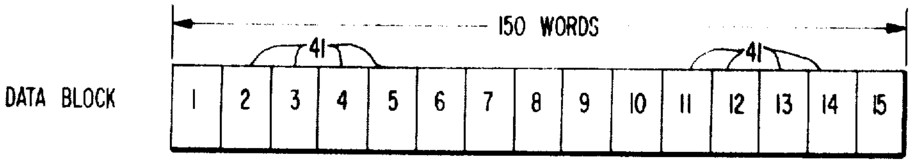
FIG. 6 is a diagram of a data block with fifteen data records.

FIG. 6 illustrates a data block 150 words in length. Each data block contains 15 data records such as shown at 41. The data record is the basic unit of stored data and is 10 words, or a maximum of 80 characters, in length. This corresponds, for example, to one complete line on a video terminal. However, since inputs in certain formats include a six character sequence number, less than 80 characters will appear in a data record in those formats. In a data format where no sequence numbers are used, the full 80 characters may contain data.

Figure 7:
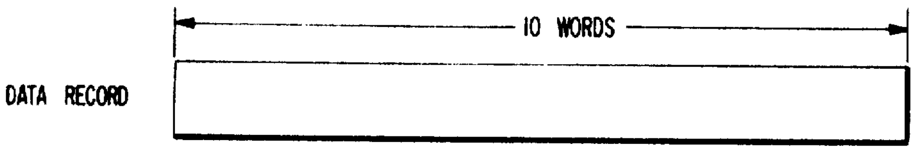
FIG. 7 is a diagram of a data record.

FIG. 7 illustrates the basic unit of storable data, the data record. As explained above, it is 10 words or a maximum of 80 characters, in length.

As will be readily appreciated by those skilled in the art this invention may be utilized with virtually any data processing system. It is not intended that its use be restricted to the Remote Input Management System environment referenced herein. Rather, this invention is limited solely by the claims appended hereto.

What we claim is:

1. The method of arranging and indexing digital data for storage in retrievable data storage devices, comprising the steps of:

- storing, in a data storage device, portions of data in a plurality of blocks of data storage locations, each of said blocks comprising *n* storage units of fixed size;
- assigning each of said storage location units which contain data *a* reference number;
- grouping reference numbers corresponding to storage location units in each of the data blocks in primary level index blocks and storing each of said primary level index blocks adjacent to the block of data storage locations which the primary level block references; and,
- storing a secondary level index block comprising reference numbers equal to or greater than the highest reference number in each of said primary level index blocks.

2. The method of claim 1, further comprising storing a position number indicating the relative position within said data blocks of the storage location unit referenced by each of said reference numbers in the primary level index blocks.

3. The method of claim 1, further comprising: storing within said secondary level index block information descriptive of the data referenced thereby.

4. The method of claim 1, further comprising:

- storing a position number indicating the relative position within said data blocks of the storage location unit referenced by each of said reference numbers in the primary level index blocks; and,
- storing within said secondary level index block information descriptive of the data referenced thereby.